United States Patent
McLaughlin et al.

(10) Patent No.: US 6,786,469 B2
(45) Date of Patent: Sep. 7, 2004

(54) ANTI-RATTLE VALVE FEATURE FOR A HEATING, VENTILATING, AND AIR CONDITIONING (HVAC) ASSEMBLY

(75) Inventors: John W. McLaughlin, Williamsville, NY (US); John Patrick Morgan, Cheektowaga, NY (US)

(73) Assignee: Delphi Technologies, Inc., Troy, MI (US)

( * ) Notice: Subject to any disclaimer, the term of this patent is extended or adjusted under 35 U.S.C. 154(b) by 64 days.

(21) Appl. No.: 10/349,280

(22) Filed: Jan. 22, 2003

(65) Prior Publication Data

US 2004/0140446 A1 Jul. 22, 2004

(51) Int. Cl.$^7$ ................................................ F16K 1/16
(52) U.S. Cl. ...................... 251/298; 251/306; 454/69; 454/121
(58) Field of Search ............................. 251/64, 87, 88, 251/298, 306, 307; 137/630.19; 454/69, 121, 156, 159, 160, 161

(56) References Cited

U.S. PATENT DOCUMENTS

| | | | | |
|---|---|---|---|---|
| 5,899,262 A | * | 5/1999 | Yamaguchi et al. | 165/42 |
| 6,123,319 A | * | 9/2000 | Maxwell | 251/307 |
| 6,431,257 B1 | * | 8/2002 | Sano et al. | 165/42 |

* cited by examiner

Primary Examiner—Edward K. Look
Assistant Examiner—John K. Fristoe, Jr.
(74) Attorney, Agent, or Firm—Patrick M. Griffin

(57) ABSTRACT

Disclosed is an anti-rattle valve feature for a heating, ventilating, and air conditioning assembly. In a typical HVAC assembly each end of an air valve shaft is received in a pivot hole permitting the air valve shaft to rotate within the assembly. Because the inside diameter of the pivot holes are larger than the outside diameter of the ends of the air valve shaft, the air valve shaft may rattle within the pivot holes. Disclosed is a finger that contacts the air valve shaft to apply pressure to the air valve shaft and biases an end of the air valve shaft against the inside of it pivot hole, thereby preventing rattling of the air valve shaft within its respective pivot holes.

23 Claims, 3 Drawing Sheets

ANTI-RATTLE VALVE FEATURE FOR A HEATING, VENTILATING, AND AIR CONDITIONING (HVAC) ASSEMBLY

TECHNICAL FIELD

The subject invention generally relates to a heating, ventilating, and air conditioning (HVAC) assembly for a motor vehicle. More specifically, the subject invention relates to a HVAC assembly that includes an anti-rattle valve feature to reduce the rattle noise generated by air valve shafts in the assembly.

BACKGROUND OF THE INVENTION

HVAC assemblies are well known in the art and find common utilization in motor vehicles. Typically an HVAC assembly is used to distribute the output from the heater, air conditioning unit, and ventilation throughout the interior of, for example, a vehicle. The HVAC assembly is manipulated by an operator to direct the output in a plurality of manners. For example, it is common to be able to select between defrost, defrost and floor, dash, dash and floor, and floor outputs from the HVAC assembly in a vehicle. Within the HVAC assembly air is directed to an appropriate outlet via movement of an air valve, typically mounted on an air valve shaft. Rotation of the shaft, either manually or mechanically, rotates the valve relative to its respective outlet to control the amount of air exiting through the outlet associated with the valve. Typically, the ends of the air valve shaft are mounted into pivot holes in a housing of the HVAC assembly to allow for positioning and rotation of the air valve shaft.

To provide for proper operation of the HVAC assembly it is important that the air valve shafts and thereby the air valves rotate with only slight resistance within the HVAC assembly. This is particularly true when mechanical means are utilized to alter the position of the air valves. To permit mounting of the air valve shafts within the housing of the HVAC assembly it is generally required that the pivot holes in the housing be larger in diameter than the pivot points at the ends of the shaft. Because of this manufacturing requirement it is possible for the air valve shafts to rattle in the pivot holes thus creating undesirable noise from the HVAC assembly. In the past others have used either greased foam pads or felt washers near the pivot points and within the pivot holes to reduce noise transmitted by rattling of the air valve shaft within the pivot hole. This solution, however, is unsatisfactory because it increases the cost and difficulty of manufacture of HVAC assemblies.

Thus, it would be beneficial to design an HVAC assembly with an anti-rattle valve feature that would allow for a low cost solution to the problem of air shaft rattle within HVAC assemblies. Any solution must maintain the rotational freedom of the air valve shaft within the pivot hole.

SUMMARY OF THE INVENTION

In a first embodiment, the present invention is a heating, ventilating, and air conditioning assembly comprising: a housing having a first pivot bole with an inside; an air valve shaft having a first pivot point, the first pivot point received in the first pivot hole and rotatable therein; and a finger, the finger contacting the shaft and biasing the first pivot point against the inside of the first pivot hole thereby reducing a rattle of the air valve shaft.

In a second embodiment, the present invention is a heating, ventilating, and air conditioning assembly comprising: a housing having a first pivot hold with an inside and a second pivot hole with an inside; an air valve shaft having a first pivot point opposite a second pivot point, the first and second pivot points received in the first and second pivot holes, respectively, and rotatable therein; a first finger, the first finger contacting the shaft and biasing the first pivot point against the side of the first pivot hole; and a second finger, the second finger contacting the shaft and biasing the second pivot point against the inside of the second pivot hole, the first and second fingers reducing a rattle of the air valve shaft.

DESCRIPTION OF THE PREFERRED EMBODIMENT

Figure 1:
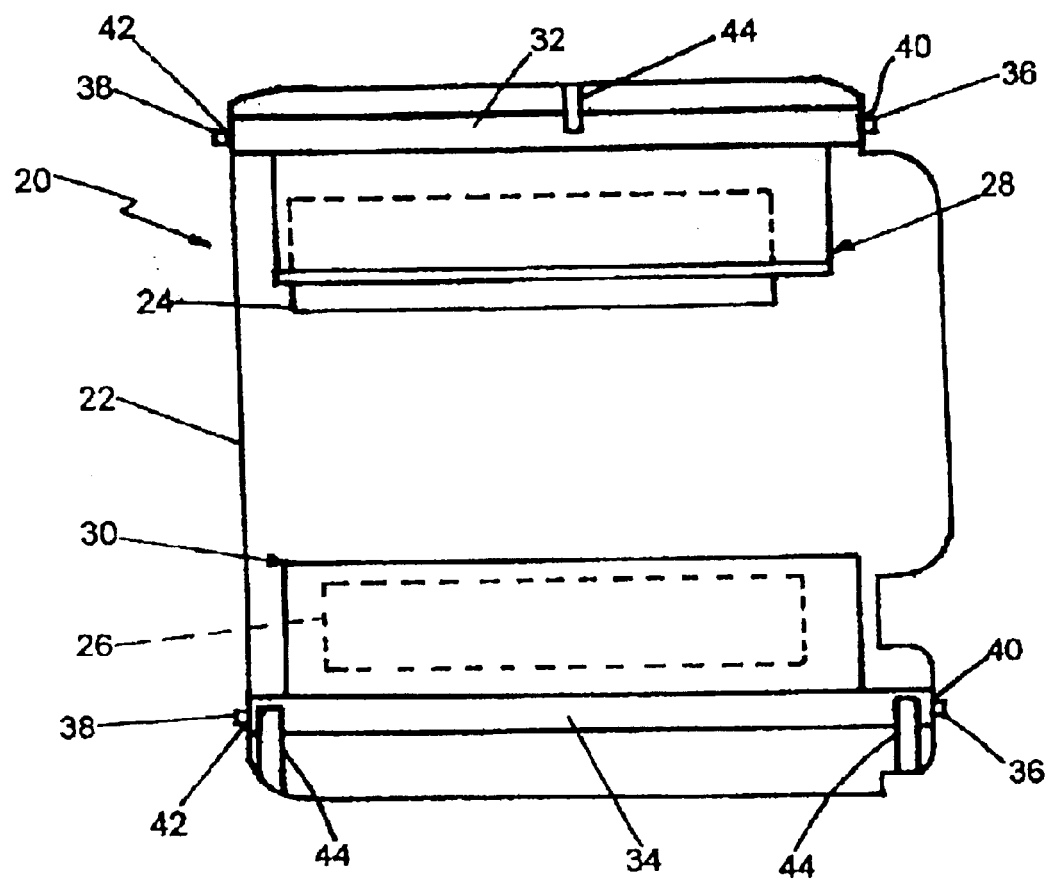
FIG. 1 is a schematic cutaway view of a HVAC assembly according to the present invention.

An HVAC assembly according to the present invention is shown generally at 20 in FIG. 1. HVAC assembly 20 includes a housing 22 and a plurality of outlets 24, 26. Controlling airflow through each of the outlets 24, 26 is an air valve 28, 30. Each air valve 28, 30 is mounted on an air valve shaft 32, 34. Each air valve shaft 32, 34 includes a first pivot point 36 opposite a second pivot point 38. The first pivot point 36 is received in a first pivot hole 40 of housing 22 and the second pivot point 38 is received in a second pivot hole 42 in housing 22. As would be understood by one of ordinary skill in the art, the pivot holes 40, 42 can either be through holes as shown or blind holes depending on design considerations. In accordance with the present invention, at least one finger 44 is associated with each shaft 32, 34. The fingers 44 contact the shaft 32, 34 and bias the pivot points 36, 38 against the inside of the respective pivot hole 40, 42. The biasing force is sufficient to greatly reduce the rattle of the shafts 32, 34, even if only a single finger 44 is used, but still allows for full and free rotation of the shafts 32, 34. As shown, in some situations only as single finger 44 is used rather than a multiple of fingers 44. If necessary, even more than two fingers 44 can be used on the same shaft 32, 34. When only a single finger 44 is used it can sometimes be preferable to locate it centrally along the shaft 32, 34.

As discussed above, the first and second pivot holes, 40 and 42, each have an inside diameter that is larger than the diameter of either the first pivot point 36 or the second pivot point 38. This clearance permits the shaft 32, 34 to be mounted in the housing 22.

Figure 2:
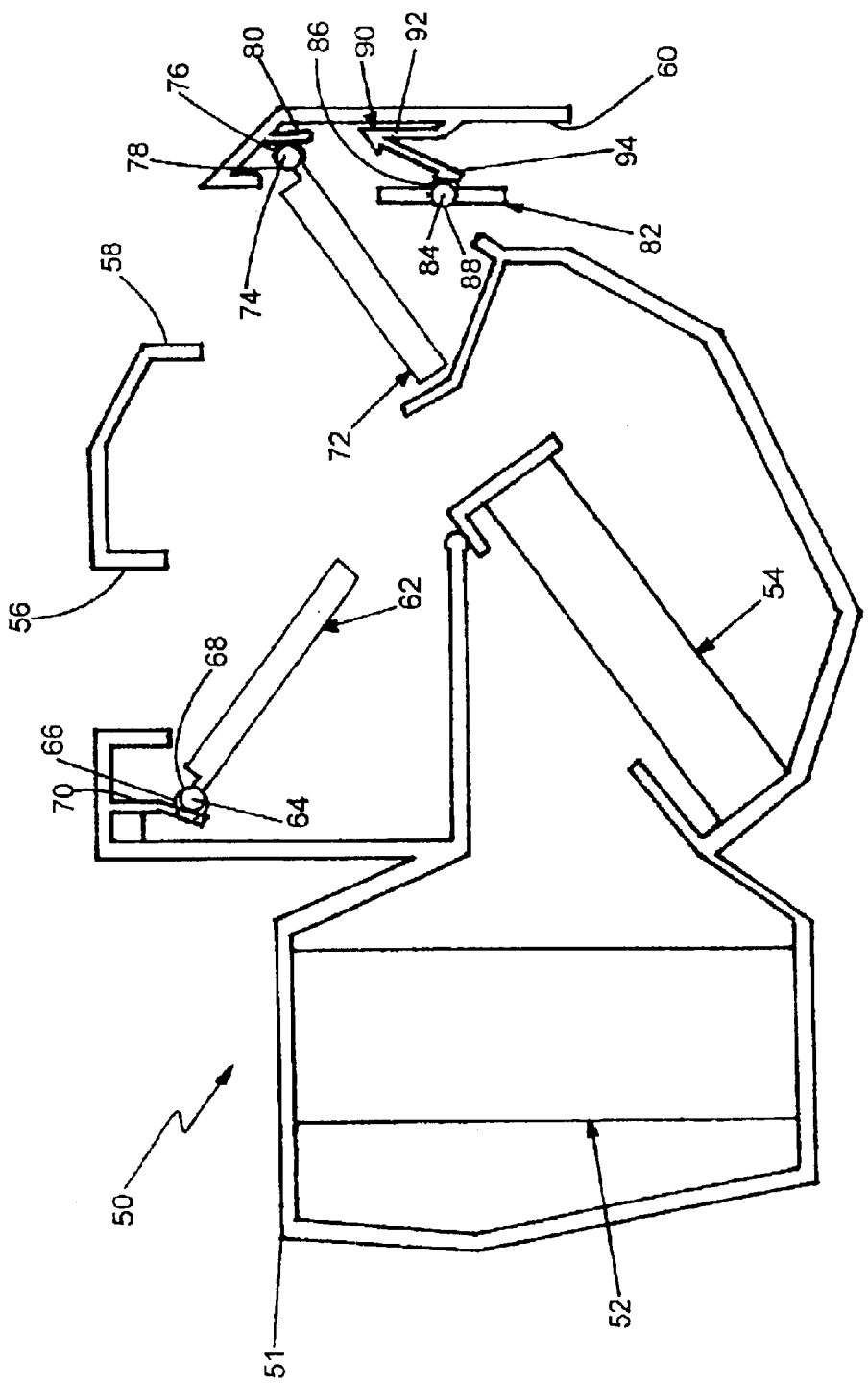
FIG. 2 is a cross-sectional schematic view of an HVAC assembly according to the present invention.

As shown in FIG. 2, a vehicle HVAC assembly 50 typically includes a housing 51 containing a number of components. FIG. 2 is a simplified and stylized schematic designed to illustrate the present invention in a simplified form for a vehicle. Typically, an evaporator 52 and a heater 54 are located within the assembly 50. The assembly 50 is shown as having a defrost outlet 56, a vent outlet 58, and a floor outlet 60.

The defrost outlet 56 includes an air valve 62 mounted to an air valve shaft 64 that rotates the valve 62. A pivot hole 66 is shown with a pivot point 68 located therein. As can be seen from the illustration, the inside diameter of the pivot hole 66 is larger than the outer diameter of the pivot point 68. A finger 70 is formed integrally with the housing 51 and extends therefrom to contact shaft 64 of the air valve 62 associated with the defrost outlet 56. As shown, the finger 70 contacts the shaft 64 and biases the pivot point 68 against the inside of the pivot hole 66. The finger 70 is sufficiently flexible and resilient that during manufacture of the HVAC assembly 50 it can be flexed out of the way to allow insertion of the pivot point 68 into the pivot hole 66. After insertion of the pivot point 68 the finger 70 springs back to contact the shaft 64.

The vent outlet 58 includes an air valve 72 mounted to an air valve shaft 74 that rotates the valve 72. A pivot hole 76 is shown with a pivot point 78 located therein. As can be seen from the illustration, the inside diameter of the pivot hole 76 is larger than the outer diameter of the pivot point 78. A finger 80 is formed integrally with the housing 51 and extends therefrom to contact shaft 74 of the air valve 72 associated with the vent outlet 58. As shown, the finger 80 contacts the shaft 74 and biases the pivot point 78 against the inside of the pivot hole 76. The finger 80 is sufficiently flexible and resilient that during manufacture of the HVAC assembly 50 it can be flexed out of the way to allow insertion of the pivot point 78 into the pivot hole 76. After insertion of the pivot point 78 the finger 80 springs back to contact the shaft 74.

The floor outlet 60 includes an air valve 82 mounted to an air valve shaft 84 that rotates the valve 82. A pivot hole 86 is shown with a pivot point 88 located therein. As can be seen from the illustration, the inside diameter of the pivot hole 86 is larger than the outer diameter of the pivot point 88. A V-shaped finger 90 is formed integrally with the housing 51 and extends therefrom to contact shaft 84 of the air valve 82 associated with the floor vent 58. The V-shaped finger 90 includes a first leg 92 attached to the housing 51 and a second leg 94 contacting the shaft 84. As shown, the finger 90 biases the pivot point 88 against the inside of the pivot hole 86. The finger 90 is sufficiently flexible and resilient that during manufacture of the HVAC assembly 50 it can be flexed out of the way to allow insertion of the pivot point 88 into the pivot hole 86. After insertion of the pivot point 88 the finger 90 springs back to contact the shaft 84. In this embodiment the finger 90 is the only finger used to bias the shaft 84.

In a preferred embodiment, the HVAC assembly 20, 50 includes a finger 44, 70, 80, 90 associated with each pivot point 36, 38, 68, 78, 88 of an air valve shaft 32, 34, 64, 74, 84. Preferably, the fingers 44, 70, 80, 90 are each located closely adjacent to the pivot points 36, 38, 68, 78, 88 and the pivot holes 40, 42, 66, 76, 86 associated with each shaft 32, 34, 64, 74, 84. Preferably the portion of the finger 44, 70, 80, 90 in contact with the shaft 32, 34,64,74,84 has a width of from 1.5 to 15.0 millimeters and more preferably from 1.5 to 10.0 millimeters.

In a preferred embodiment, the finger 44, 70, 80, 90 is formed from the same material as the housing 22, 51 typically a plastic material, such as, for example, an injection molded polypropylene with 20 to 40 percent talc. Preferably the finger 44, 70, 80, 90 is formed integrally with the housing 22, 51, which is often a molded plastic part. In other embodiments, however, it is possible to form finger 44, 70, 80, 90 from materials other than those of the housing 22, 51 and then securing one end of the finger 44, 70, 80, 90 to the housing 22, 51 in manners known in the art. Such attachment could comprise an adhesive, an interlocking fit, or a friction fit. In a preferred embodiment, however, the finger 44, 70, 80, 90 is formed from the housing 22, 51 leading to greatly reduced costs for the present invention The finger 44, 70, 80, 90 is a resiliently flexible finger 44, 70, 80, 90 thus permitting it to be flexed during manufacture of the HVAC assembly 20, 50. After assembly the finger 44, 70, 80, 90 returns to its previous position and contacts the air valve shaft 32, 34, 64, 74, 84. Finger 44, 70, 80, 90 applies force to the air valve shaft 32, 34, 64, 74, 84, thereby forcing the pivot points 36, 38, 68, 78, 88 against the insides of the pivot holes 40, 42, 66, 76, 86.

Figure 3:
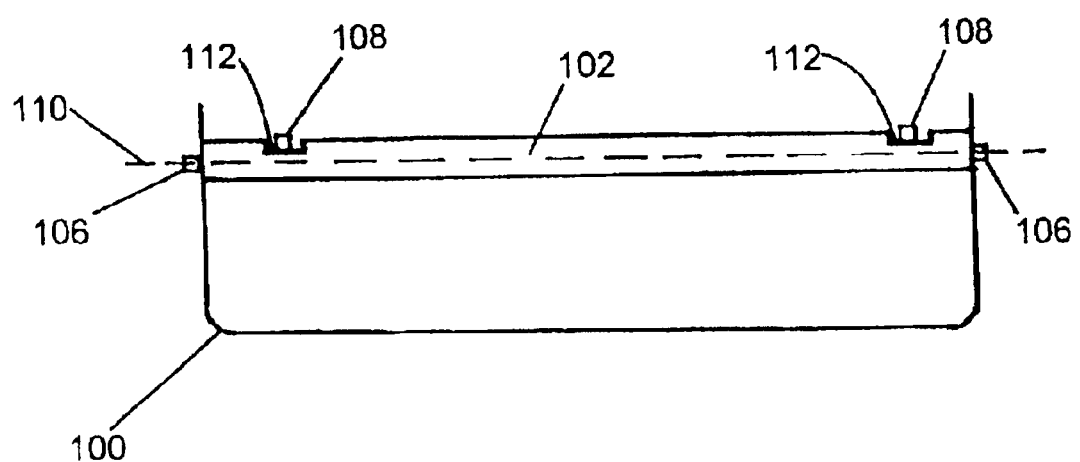
FIG. 3 is a cross-sectional schematic view of an alternative HVAC assembly according to the present invention.

FIG. 3 discloses another embodiment. The cross-sectional view is of an HVAC assembly frame 100 having an air valve shaft 102 located therein. The air valve shaft 102 includes a first pivot point 104 located opposite a second pivot point 106. The pivot points 104, 106 are mounted into respective pivot holes, not shown. A finger 108 contacts the shaft 102. The shaft 102 has a central axis of rotation 110. It has been found that contacting the finger 108 as close to the central axis of rotation 110 as possible in this and all other embodiments presented herein minimizes any adverse rotational resistance associated with the finger 108. In the embodiment shown in FIG. 3 the shaft 102 includes a slot 112 to receive the finger 108 and allow it to contact the shaft 102 at a location very close to the axis of rotation 110. The slot 112 can have any shape and can be formed by removing a part of the shaft 102. Because the shaft 102 often does not need to be capable of full rotation about its central axis of rotation 110 the slot 112 does not need to completely encircle the shaft 102. If advantageous, however, the slot 112 can be formed as a groove that encircles the shaft 102. This same slot 112 feature can be used when only a single finger 44 is used.

The present invention finds utilization in HVAC assemblies wherein rattling of air valve shafts creates undesirable noise. The invention can be easily incorporated into the manufacturing of the housing of the HVAC assembly itself thus providing a low cost solution to the problem of air valve shaft rattling noise.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A heating, ventilating, and air conditioning assembly comprising:
   a housing having a first pivot hole with an inside;
   an air valve shaft having a first pivot point, said first pivot point received in said first pivot hole and rotatable therein; and
   a finger, said finger contacting said shaft and biasing said first pivot point against said inside of said first pivot hole thereby reducing a rattle of said air valve shaft.

2. The assembly of claim 1, wherein said finger is formed from a resiliently flexible material.

3. The assembly of claim 1, wherein said finger is formed from a plastic material.

4. The assembly of claim 1, wherein said finger is formed integrally with said housing.

5. The assembly of claim 4, wherein said finger extends from said housing toward said shaft.

6. The assembly of claim 1, wherein said finger is located adjacent to said first pivot hole.

7. The assembly of claim 1, wherein said finger is positioned perpendicularly relative to said shaft.

8. The assembly of claim 1, wherein said finger is V-shaped with a first leg of said V-shape attached to said housing and a second leg of said V-shape contacting said shaft.

9. The assembly of claim 1, wherein said finger has a width of from 1.5 to 15 millimeters where it contacts said shaft.

10. The assembly of claim 1, wherein said finger has a width of from 1.5 to 10 millimeters where it contacts said shaft.

11. The assembly of claim 1, wherein said finger is received in one of a slot or a groove formed in said shaft.

12. A heating, ventilating, and air conditioning assembly comprising:

a housing having a first pivot hole with an inside and a second pivot hole with an inside;

an air valve shaft having a first pivot point opposite a second pivot point, said first and second pivot points received in said first and second pivot holes, respectively, and rotatable therein;

a first finger, said first finger contacting said shaft and biasing said first pivot point against said inside of said first pivot hole; and a second finger, said second finger contacting said shaft and biasing said second pivot point against said inside of said second pivot hole, said first and second fingers reducing a rattle of said air valve shaft.

13. The assembly of claim 12, wherein said first and second fingers are formed from a resiliently flexible material.

14. The assembly of claim 12, wherein said first and second fingers are formed from a plastic material.

15. The assembly of claim 12, wherein said first and second fingers are formed integrally with said housing.

16. The assembly of claim 15, wherein said first and second fingers extend from said housing toward said shaft.

17. The assembly of claim 12, wherein said first finger is located closely adjacent to said first pivot hole and said second finger is located closely adjacent to said second pivot hole.

18. The assembly of claim 12, wherein said first and second fingers are positioned perpendicularly relative to said shaft.

19. The assembly of claim 12, wherein at least one of said first and said second fingers is V-shaped with a first leg of said V-shape attached to said housing and a second leg of said V-shape contacting said shaft.

20. The assembly of claim 12, wherein both of said first and said second fingers are V-shaped with a first leg of each of said V-shapes attached to said housing and a second leg of each of said V-shapes contacting said shaft.

21. The assembly of claim 12, wherein said first and second fingers each have a width of from 1.5 to 15 millimeters where they contact said shaft.

22. The assembly of claim 12, wherein said first and second fingers have a width of from 1.5 to 10 millimeters where they contact said shaft.

23. The assembly of claim 12, wherein at least one of said first and second fingers is received in one of a slot or a groove formed in said shaft.

* * * * *